(12) United States Patent
Buchwald

(10) Patent No.: US 6,598,850 B2
(45) Date of Patent: Jul. 29, 2003

(54) BUTTERFLY VALVE LOCKING APPARATUS

(75) Inventor: David W. Buchwald, Aurora, IL (US)

(73) Assignee: Henry Pratt Company, Aurora, IL (US)

( * ) Notice: Subject to any disclaimer, the term of this patent is extended or adjusted under 35 U.S.C. 154(b) by 0 days.

(21) Appl. No.: 09/978,012

(22) Filed: Oct. 17, 2001

(65) Prior Publication Data

US 2002/0047101 A1 Apr. 25, 2002

Related U.S. Application Data

(60) Provisional application No. 60/241,334, filed on Oct. 19, 2000.

(51) Int. Cl.[7] ............................................... F16K 35/10
(52) U.S. Cl. ......................................... 251/95; 251/109
(58) Field of Search ............................. 251/95, 96–109, 251/110–116, 89–94

(56) References Cited

U.S. PATENT DOCUMENTS

| | | | | | |
|---|---|---|---|---|---|
| 1,669,844 A | * | 5/1928 | Sparks | ........................ | 251/104 |
| 1,716,277 A | * | 6/1929 | Messmer | ...................... | 251/96 |
| 2,740,423 A | * | 4/1956 | Stillwagon | .................... | 251/96 |
| 2,939,674 A | * | 6/1960 | Anderson | ..................... | 251/99 |
| 3,349,639 A | * | 10/1967 | Magoon | ...................... | 251/105 |
| 3,537,473 A | * | 11/1970 | DeZurik, Jr. | .................. | 251/96 |
| 5,215,112 A | * | 6/1993 | Davison | ....................... | 251/90 |
| 5,244,008 A | * | 9/1993 | Bauer | ........................... | 251/93 |

* cited by examiner

*Primary Examiner*—Paul J. Hirsch
(74) *Attorney, Agent, or Firm*—Troutman Saunders LLP; Gerald R. Boss, Esq.; Michael S. Kerns, Esq.

(57) ABSTRACT

A locking device for a butterfly type valve is provided with an actuating shaft extending through a bore provided in a conduit in which the valve is located; the inner end of the shaft carries a locking arm that is movable upon rotation of the shaft between a locking and unlocking position relative to the valve.

14 Claims, 2 Drawing Sheets

BUTTERFLY VALVE LOCKING APPARATUS

This application is claims the benefit of provisional application Serial No. 60/241,334 filed Oct. 19, 2000.

FIELD OF THE INVENTION

This invention relates to apparatus for positively locking a butterfly valve disk in a closed position to assure safe conduit maintenance downstream of the valve.

BACKGROUND OF THE INVENTION

Butterfly valves have enjoyed widespread use in a large number of industrial applications in view of their reliability, operational ease and relatively low-cost. Typically, a butterfly valve comprises a circular plate that is mounted for rotation about a diameter of the plate either on a pivot rod that extends through a bore formed in the plate or the plate may be formed with lugs extending outwardly from the periphery, again, along a diameter. At least one end of the pivot rod or the lug will be connected to a valve actuating device which, when operated, will rotate the plate on the pivot rod or the lugs to effect opening and closing of the valve. Where maintenance on the conduit downstream of the valve is being carried out, it is necessary that the valve be maintained in its closed position for economic and safety reasons particularly in large valve installations were workers enter the conduit to perform work internally.

In the past, it has been the practice to use one or more site employees to monitor the valve position and verify closure while downstream work takes place. Typically, positive closure relies entirely upon the resistance provided by the actuating device. Such precautions are not only costly but do not in all cases effectively guard against failure and leakage past the valve. In the case of toxic or similar fluids, should the valve fail, those monitoring the valve must act quickly to manually override the actuator to minimize any damage or injury.

SUMMARY OF THE INVENTION

The present invention provides an operator with a mechanical means to ensure that a butterfly valve disk or plate is positively locked while in the closed position. In many, if not all butterfly valve installations, the annular seal mounted in the conduit with which the valve plate cooperates, allows rotation of the plate in a prescribed direction relative to the higher pressure side of the valve installation. Thus, in one form of the invention, the valve locking mechanism of this invention will be a mounted to operate through the conduit wall on the lower pressure side of the butterfly valve, adjacent to the valve. The device includes a circular headpiece securely mounted on the end of a shaft which has a threaded portion that cooperates with a hand wheel to effect raising and lowering of the shaft by rotation about its longitudinal axis whereby the external threads of the shaft cooperate with the internal threads on the hand wheel. A restraining mechanism is provided to prevent rotation of the shaft while the hand wheel is rotated to move the shaft relative to the valve housing. With this arrangement, operation of the hand wheel extends the threaded shaft into the conduit to bring the headpiece to a proper radial position in the conduit so that after positioning of the shaft relative to the valve plate, the headpiece can be rotated by means of the shaft to bring it into contact with a side of the butterfly valve plate to thereby prevent opening of the valve plate. With this arrangement, effective locking and unlocking can be quickly and simply carried out.

The foregoing and other advantages of the present invention will become apparent as consideration is given to the following detailed description taken in conjunction with the accompanying drawings, in which:

DETAILED DESCRIPTION OF THE INVENTION

Figure 1:
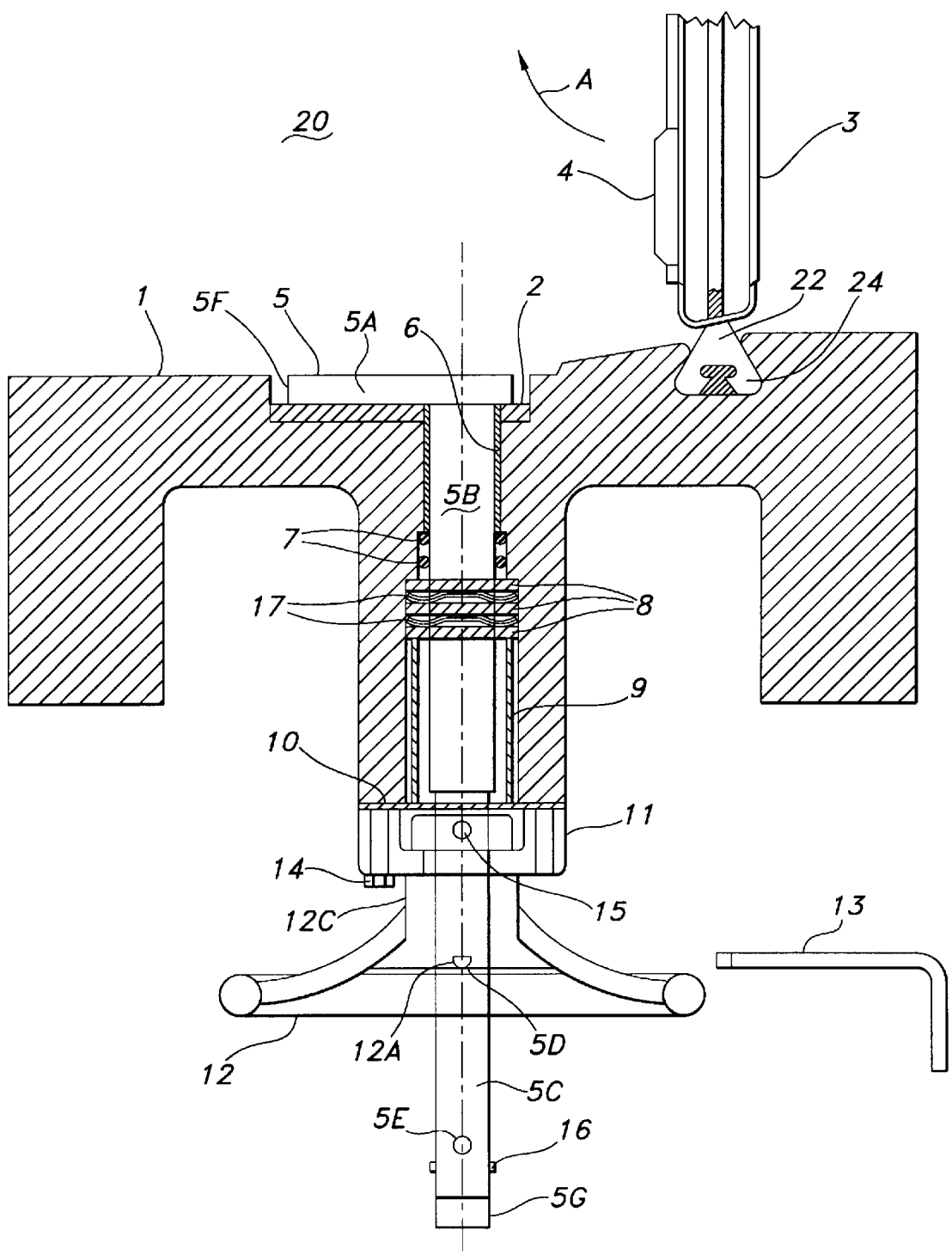
FIG. 1 is a side, sectional view in elevation of the locking device of the present invention in its unlocked position.
Figure 2:
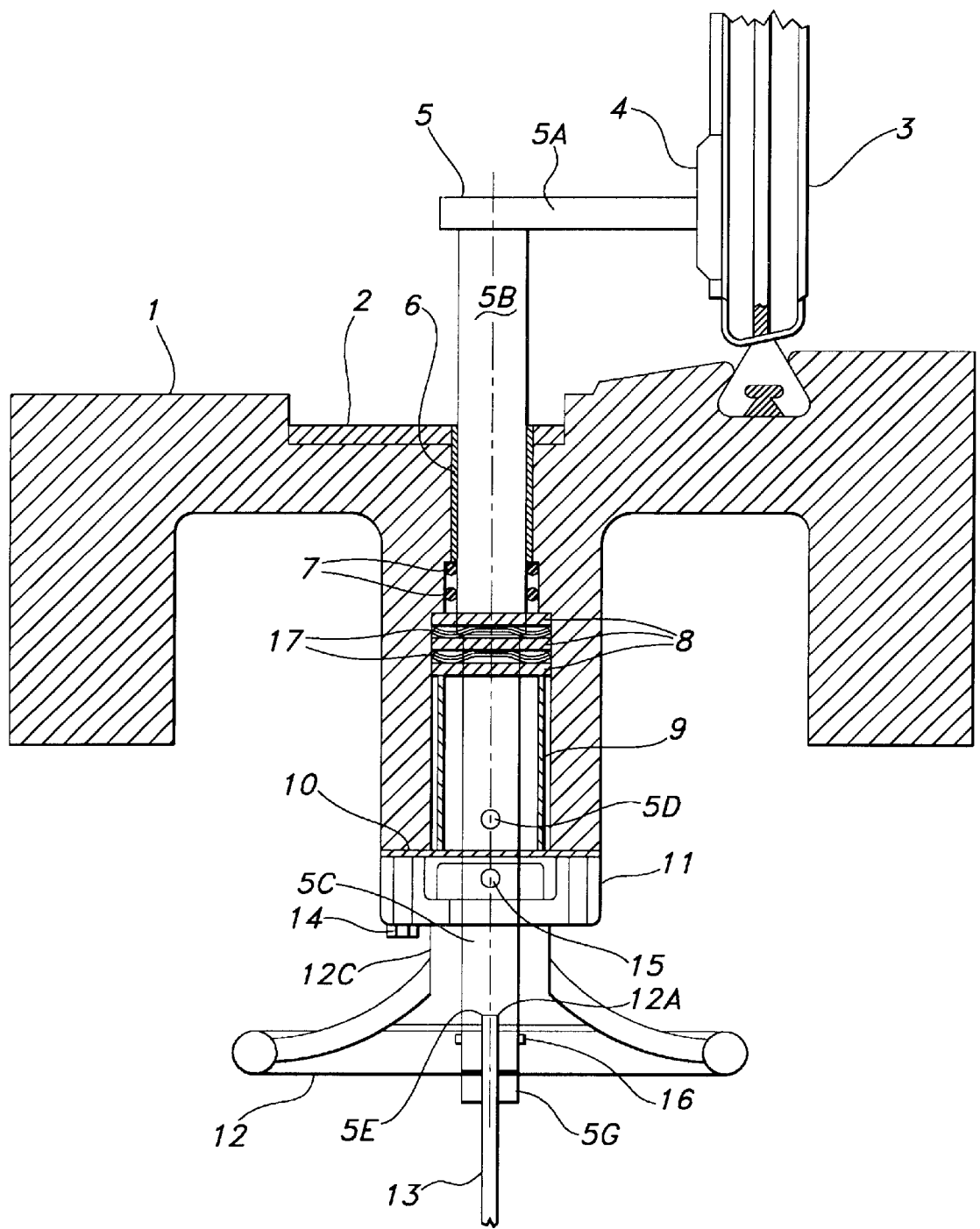
FIG. 2 is a view similar to FIG. 1 but showing the locking device in its locked position.

Referring to the drawings, wherein like numerals designate corresponding parts throughout the views, there is shown in FIG. 1, the locking device 5 of the present invention in its retracted, unengaged condition. As shown, the locking device 5 is mounted on a conduit 20 in which is mounted the plate 3 of a butterfly valve which, on one face, is provided with a strike plate portion 4 for cooperating with the locking device, as explained below. As is conventional with butterfly valves, the plate 3 will be mounted for rotation about a pivot axis that extends typically through its diameter from its illustrated closed position in the direction of arrow A to an open position. It will be noted that the periphery of the plate 3 extends at an angle to the direction of flow through the conduit 20 which will be from the right to the left as shown in FIG. 1. An annular sealing ring 22 is mounted in a groove 24 as is conventional and projects a small amount into the conduit 20 to provide a secure and resilient sealing for the plate 3 of the butterfly valve. The structure and operation of the butterfly valve is conventional and forms no part of the present invention and will therefore not be further described.

Preferably, a recess is provided in the conduit wall 1 and a corrosion resistant plate 2 is disposed in the recess and on which rests the circular head 5A when the locking device 5 is unengaged. One end 5B of a shaft is secured as by welding to one side of the circular head 5A adjacent to a periphery of the circular head 5A to provide an extended body to serve as the locking member. Between the middle and lower end 5C of the shaft, external threads are provided over at least a portion of its length to engage with internal threads provided in the neck or collar 12C of hand wheel 12 and through which the shaft extends, as shown. The hand wheel 12 is secured to the shaft by means of a key 13. When key 13 is inserted after raising the locking device 5, rotation of the hand wheel will effect rotation of the shaft about its longitudinal axis and movement of the circular head 5A into and out of its locking position. Installation of pin or set screw 15, fixing the relative positions of the coupling 11 and collar 12C, will prevent further rotation of the shaft 5B and head 5A.

Two O-ring lip seals 7 are provided to resist internal fluid pressure from the conduit. These seals are held in place by a plate and spring assembly composed of three plates 8 and two stacks of 3 wave springs 17. The plate and spring assembly is secured by a packing gland retainer 9 which is fixed in place by a larger retaining plate 10. This retaining plate and the hand wheel coupling 11 are bolted to the body protrusion by cap screws 14.

As described above, when the hand wheel is rotated, in one direction, the shaft (5B and 5C) will move axially relative to the collar 12C to raise the circular plate 5 from its recess to a height sufficient so that upon subsequent rotation of the shaft, as explained below, the edge 5D remote from the shaft 5B of the circular plate 5A will come into contact with the strike plate 4 provided on the face of the valve plate 3. Rotation of the shaft while operating the hand wheel can be prevented by providing rectangularly extending flats at the end 5G of the shaft to allow ease of attachment of a tool such as a wrench to hold the shaft while moving the circular plate 5A between its locking and disengaged positions. With the circular plate 5A raised to the appropriate height whereby the hand wheel groove 12A is aligned with the shaft opening 5E, a key 13 is inserted into the opening 5E provided in the shaft lower end. The edge 5F of the circular plate 5A can then be rotated into position by the hand wheel 12 so that edge 5F is in contact with the strike plate 4. The set screw 15 is provided to pin the hand wheel 12 to the coupling 11 at the hand wheel collar 12C and to prevent the head 5A from rotating away from the strike plate 4.

As will be apparent to those skilled in this art, other techniques for raising the shaft 5B may be employed such as a hydraulic system, a mechanical jacking device or similar devices.

Having described the invention, it will be apparent to those skilled in this art that various modifications may be made thereto without departing from the spirit and scope of the invention.

What is claimed is:

1. A locking device for a valve of the type having a plate mounted in a flow conduit and movable between an open position wherein the plate allows passage of fluid material through the conduit from one side of the plate to the other side thereof, and a closed position wherein the plate blocks passage of fluid through said flow conduit, said conduit having an opening through which an actuating member extends and which includes a locking arm movable by said actuating member between an unlocking position wherein said locking arm is out of engagement with said plate and a locking position wherein said locking arm engages one side of said plate, said actuating member having a portion that extends externally of the conduit thereby allowing access to said actuating member by an operator.

2. The invention as claimed in claim 1 wherein said conduit includes a bore through which said actuating member extends, said bore including sealing members for preventing leakage of the contents of the conduit through said bore.

3. The invention as claimed in claim 1 wherein said conduit includes an interior surface including a recessed portion receiving said locking arm when said locking arm is in said unlocking position.

4. The invention as claimed in claim 3 wherein said recessed portion includes a protective plate having an opening through which a portion of said actuating member extends.

5. The invention as claimed in claim 1 wherein said actuating member includes a shaft portion having a longitudinal axis and having one end connected to said locking arm so that rotation of said shaft portion will effect rotation of said locking arm about said axis.

6. The invention as claimed in claim 5 wherein said locking arm has the form of a circular plate having a periphery, said shaft portion being connected to said circular plate adjacent to said periphery.

7. The invention as claimed in claim 6 wherein said circular plate has a thickness such that when in said unlocking position, said plate extends no further than said interior surface of the conduit.

8. The invention as claimed in claim 5 wherein the conduit includes a collar carried about said shaft portion and rotatably supporting a rotating member, said rotating member having a central member including a threaded bore and said shaft portion having threads engaging said threaded bore of said rotating member so that upon rotation of said rotating member in one direction, said shaft portion will advance into the conduit and upon rotation of said rotating member in an opposite direction, said shaft portion will retract from the conduit.

9. The invention as claimed in claim 8 wherein said rotating member is a hand wheel.

10. The invention as claimed in claim 8 wherein said shaft portion and said rotating member having interlockable portions so that, when interlocked, rotation of said rotating member will effect rotation of said shaft portion to thereby effect rotation of said locking arm between said locking and unlocking positions.

11. The invention as claimed in claim 10 wherein said interlockable portions includes a bore in said shaft portion and a groove on said rotating member and a key insertable into said bore of said shaft portion and engageable with said groove when said bore of said shaft portion and said groove are in alignment.

12. The invention as claimed in claim 8 wherein said rotating member includes a set screw movable to engage a portion of said collar to prevent rotation of said rotating member relative to said collar.

13. A locking device for a valve of the type having a plate mounted in a flow conduit and movable between an open position wherein the plate allows passage of fluid material through the conduit from one side of the plate to the other side thereof, and a closed position wherein the plate blocks passage of fluid through said flow conduit, said conduit having an opening through which an actuating member extends and which includes a locking arm movable by said actuating member between an unlocking position wherein said locking arm is out of engagement with said plate and a locking position wherein said locking arm engages one side of said plate, said actuating member having a portion that extends externally of the conduit thereby allowing access to said actuating member by an operator, said conduit including a transverse bore and said actuating member comprising a shaft extending through said bore and externally thereof, said actuating member comprising a shaft having a longitudinal axis and a portion located internally of said conduit and being attached to said locking arm adjacent a portion of said locking arm so that rotation of said shaft about said longitudinal axis will effect rotation of said locking arm about said longitudinal axis between said unlocking position wherein said locking arm is out of contact with said plate and said locking position wherein said arm engages said plate to restrain movement of said plate.

14. The invention as claimed in claim 13 wherein the conduit includes a collar carried about a portion of said shaft that is externally located relative to said bore and rotatably supporting a rotating member, said rotating member having a central member including a threaded bore and said shaft portion having threads engaging said threaded bore of said rotating member so that upon rotation of said rotating member in one direction, said shaft portion will advance into the conduit and upon rotation of said rotating member in an opposite direction, said shaft portion will retract from the conduit, wherein said shaft portion and said rotating member have interlockable portions so that, when interlocked, rotation of said rotating member will effect rotation of said shaft portion to thereby effect rotation of said locking arm between said locking and unlocking positions.

* * * * *